US012606224B2

(12) United States Patent

Tang

(10) Patent No.: US 12,606,224 B2
(45) Date of Patent: Apr. 21, 2026

(54) ROLLING STORAGE CART WITH DRAWERS

(71) Applicant: Pao-Hsun Tang, Lukang Township, Changhua County (TW)

(72) Inventor: Pao-Hsun Tang, Lukang Township, Changhua County (TW)

( * ) Notice: Subject to any disclaimer, the term of this patent is extended or adjusted under 35 U.S.C. 154(b) by 353 days.

(21) Appl. No.: 18/508,228

(22) Filed: Nov. 14, 2023

(65) Prior Publication Data

US 2025/0153753 A1 May 15, 2025

(51) Int. Cl.
B62B 3/02 (2006.01)
B62B 3/00 (2006.01)

(52) U.S. Cl.
CPC ............... B62B 3/005 (2013.01); B62B 3/02 (2013.01); *B62B 2205/30* (2013.01)

(58) Field of Classification Search
CPC ..................................................... B62B 3/005
See application file for complete search history.

(56) References Cited

U.S. PATENT DOCUMENTS

| | | | | | |
|---|---|---|---|---|---|
| 2,480,025 | A | * | 8/1949 | Hunter | A61G 7/08 |
| | | | | | 280/35 |
| 2,926,022 | A | * | 2/1960 | Nau | A47B 31/00 |
| | | | | | 296/22 |
| 3,111,915 | A | * | 11/1963 | Gray | A47B 57/04 |
| | | | | | 108/106 |

| | | | | | |
|---|---|---|---|---|---|
| 3,831,959 | A | * | 8/1974 | Fontana | B62B 5/0083 |
| | | | | | 280/79.11 |
| 4,620,637 | A | * | 11/1986 | Karashima | A47B 96/00 |
| | | | | | 280/47.35 |
| 5,913,582 | A | * | 6/1999 | Coonan | A47B 21/007 |
| | | | | | 312/249.11 |
| 6,079,719 | A | * | 6/2000 | Tisbo | B62B 3/006 |
| | | | | | 280/47.35 |
| D574,570 | S | * | 8/2008 | Tsai | D34/12 |
| 8,011,678 | B1 | * | 9/2011 | Bell | B62D 7/026 |
| | | | | | 280/771 |
| D697,285 | S | * | 1/2014 | Greenspon | D34/21 |
| 9,913,533 | B1 | * | 3/2018 | Ke | B62B 3/002 |
| 9,981,677 | B1 | * | 5/2018 | Gross | B62B 3/025 |
| 9,989,299 | B1 | * | 6/2018 | Ballard | B65D 81/3813 |
| 10,717,454 | B1 | * | 7/2020 | Alvarez | B62B 3/02 |
| D1,006,385 | S | * | 11/2023 | Zhou | D34/21 |
| 2002/0112937 | A1 | * | 8/2002 | Lutz | B65G 41/005 |
| | | | | | 193/37 |
| 2007/0080614 | A1 | * | 4/2007 | Stein | A47B 47/042 |
| | | | | | 312/107 |
| 2010/0129186 | A1 | * | 5/2010 | Foote | B62B 5/0083 |
| | | | | | 414/812 |
| 2013/0063012 | A1 | * | 3/2013 | Lu | B25H 3/06 |
| | | | | | 312/334.7 |

(Continued)

*Primary Examiner* — Erez Gurari

(57) ABSTRACT

A rolling storage cart with drawers has at least one cart member and a plurality of drawers. The cart member has two side frames, two top edge bars, two bottom edge bars, and a plurality of wheels; each side frame has a main frame with a plurality of drawer tracks. Two ends of each edge bar respectively has an engaging column, and a top end and bottom end of each main frame respectively jackets onto one of the engaging columns of each edge bar. Each wheel has a screw lock for securing onto one of the bottom edge bars. Each drawer is configured to slidably engage two grooves of two opposite drawer tracks.

8 Claims, 10 Drawing Sheets

(56)         References Cited

U.S. PATENT DOCUMENTS

| | | | |
|---|---|---|---|
| 2013/0146553 A1* | 6/2013 | Preidt | A47F 5/137 |
| | | | 211/153 |
| 2013/0221820 A1* | 8/2013 | Chang | B25H 3/02 |
| | | | 312/330.1 |
| 2014/0110366 A1* | 4/2014 | Wu | A47B 47/0083 |
| | | | 248/346.03 |
| 2014/0152238 A1* | 6/2014 | Racenet | A61B 50/13 |
| | | | 320/107 |
| 2015/0191192 A1* | 7/2015 | Savage | B62B 3/108 |
| | | | 280/47.35 |
| 2016/0055447 A1* | 2/2016 | Sehmer | A47F 5/137 |
| | | | 235/385 |
| 2016/0235197 A1* | 8/2016 | Kabacinski | B62B 3/005 |
| 2018/0147716 A1* | 5/2018 | Gang | B25H 3/028 |
| 2020/0222261 A1* | 7/2020 | Ito | G06K 19/0728 |
| 2020/0308758 A1* | 10/2020 | Shimizu | B62B 3/025 |
| 2022/0097747 A1* | 3/2022 | Beckwith | B25H 3/028 |
| 2022/0194452 A1* | 6/2022 | Ho | D06F 95/002 |
| 2023/0182796 A1* | 6/2023 | Armbruster | B62B 3/003 |
| | | | 280/47.35 |
| 2023/0264730 A1* | 8/2023 | Stachler | B62B 5/06 |
| | | | 280/47.35 |
| 2023/0399040 A1* | 12/2023 | Skeid | A47B 47/0083 |
| 2025/0153753 A1* | 5/2025 | Tang | B62B 3/02 |

* cited by examiner

111

121

31

30

12

ROLLING STORAGE CART WITH DRAWERS

BACKGROUND OF INVENTION

Field of Invention

The present invention relates to a rolling storage cart with drawers and more particularly to a rolling storage cart with drawers.

Description of Related Art

Rolling storage cart is easy to store and move. It is widely used in homes, factories and other places. The storage cart occupies a large volume if is completely assembled, therefore, it is common to know that the storage cart is mostly packaged in pieces in boxes to be used when needed. When in use, just open the box and take out the various components for installation, which can greatly reduce the packaging volume. In order to assemble the components, it is inevitable to use screws and other connecting components which makes assembly tools such as hexagonal wrenches are necessary in the package for assembly or disassembly, which not only affects the time and labor costs of the user's assembly or disassembly, but also increases the manufacturing cost.

Therefore, it is desirable to provide a rolling storage cart with drawers to mitigate and/or obviate the aforementioned problems.

SUMMARY OF INVENTION

An objective of present invention is to provide a rolling storage cart with drawers, which is capable of improving the above-mention problems.

In order to achieve the above mentioned objective, a rolling storage cart with drawers has at least one cart member and a plurality of drawers. The cart member has two side frames, two top edge bars, two bottom edge bars, and a plurality of wheels; each side frame has a main frame with a plurality of drawer tracks. Two ends of each edge bar respectively has an engaging column, and a top end and bottom end of each main frame respectively jackets onto one of the engaging columns of each edge bar. Each wheel has a screw lock for securing onto one of the bottom edge bars. Each drawer is configured to slidably engage two grooves of two opposite drawer tracks.

Other objects, advantages, and novel features of invention will become more apparent from the following detailed description when taken in conjunction with the accompanying drawings.

DETAILED DESCRIPTION OF PREFERRED EMBODIMENT

Figure 1:
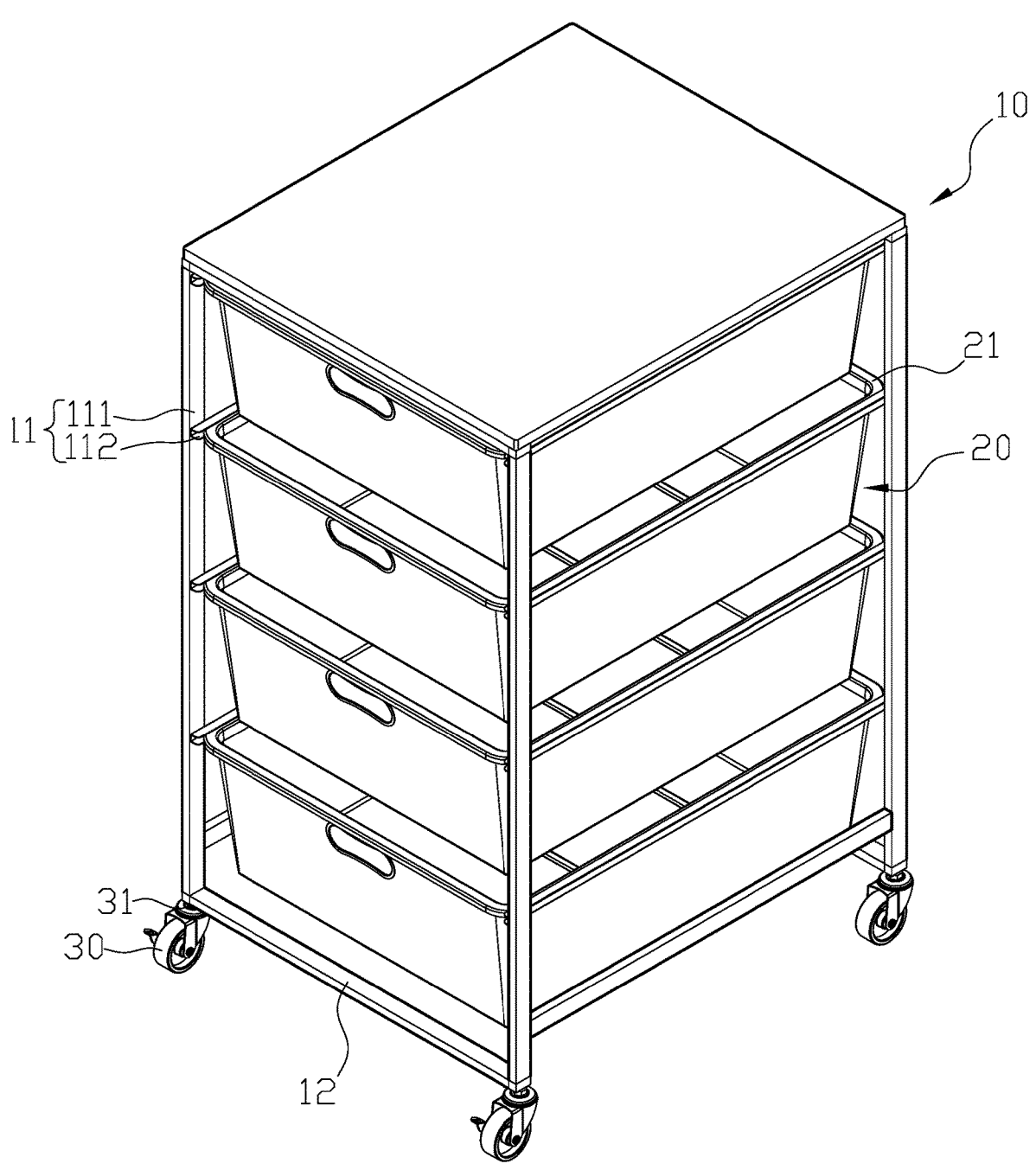
FIG. 1 is a three-dimensional view of the damping device and the damper according to a preferred embodiment of the present invention.

First, please refer to FIGS. 1 to 8. A rolling storage cart with drawers comprises: at least one cart member 10 and a plurality of drawers 20. The cart member 10 has two side frames 11 two top edge bars 12, two bottom edge bars 12, and a plurality of wheels 30. Each side frames has main frame 111 with a plurality of drawer tracks 112. Two ends of edge bar 12 respectively has an engaging column 121, and a top end and bottom end of each main frame 111 respectively jackets onto one of the engaging columns 121 of each edge bar 12. Which combines the top and bottom of the side frame 11 with the top and bottom edge bars 12. Each wheel 30 has a screw lock 31 for securing onto one of the bottom edge bars 12 such that the cart member 10 is slidable. The side frame 11, the edge bar 12 and the wheels 30 are all independent of each other and have been combined as finished products. Each drawer 20 is configured to slidably engage two grooves of two opposite drawer tracks 112.

With the above structure, since the side frame 11, the edge bar 12, and the casters 30 are all independent of each other and have been combined as finished products without additional connecting members and assembly tools required, which is convenient for users to assemble or disassemble. The cart member 10 and the drawer 20 can be assembled directly by bare hands, therefore, there is no needs for assembly tools, which further facilitates the user's assembly or disassembly.

Therefore, the assembly of the side frame 11 and the edge bar 12 does not require the use of tools and connecting members for locking, which can reduce the complexity of assembly and add convenience for users.

As shown in FIGS. 4-8, the cart member 10 further comprises a top board 13 configured to be secured onto the top edge bars 12 by a locking member 131.

Furthermore, locking member 131 is configured to be hand operable.

Figure 7:
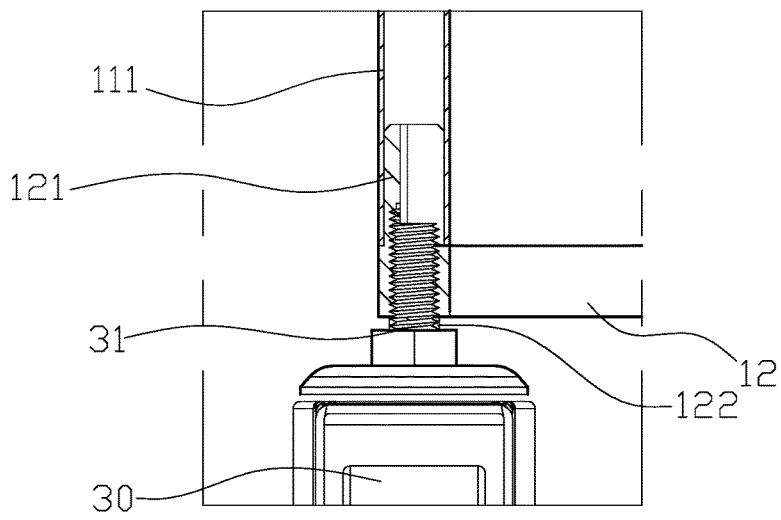
FIG. 7 is a local cross-sectional view of the bottom part of the preferred embodiment of the present invention.
Figure 8:
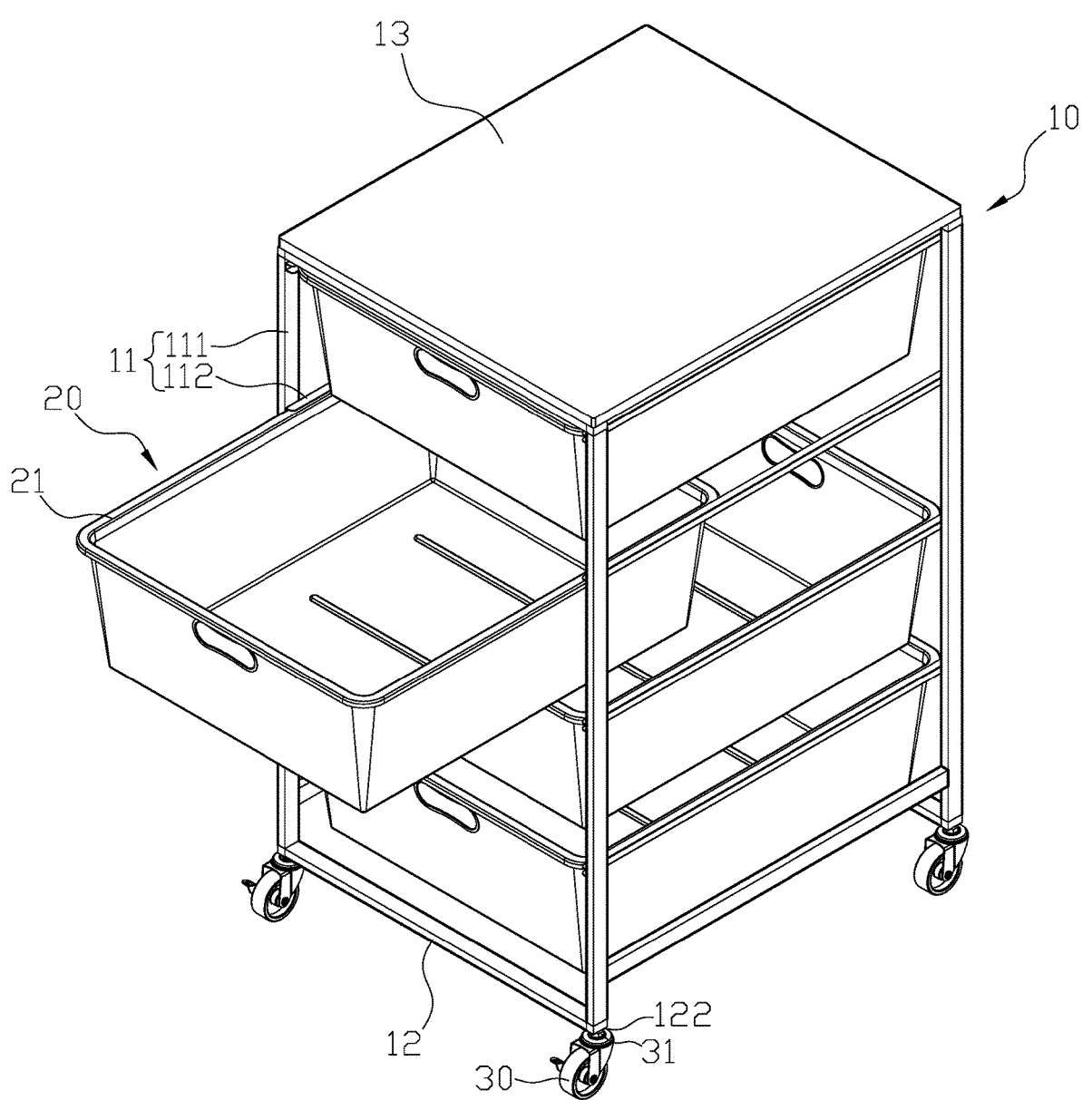
FIG. 8 is a schematic diagram of the preferred embodiment of the present invention.

As shown in FIG. 7, each screw lock 31 is located at the engaging column 121 of the bottom edge bar 12.

Figure 2:
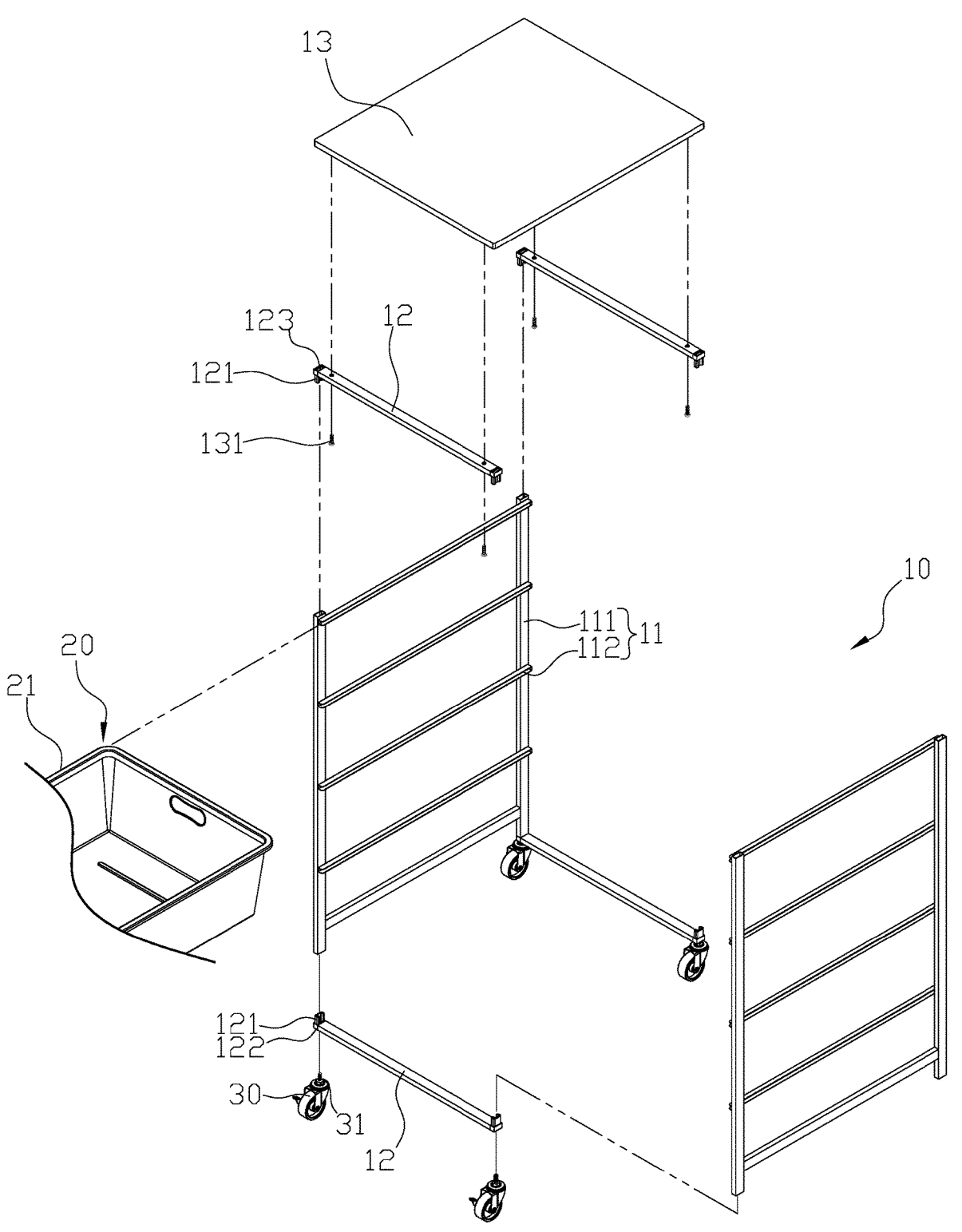
FIG. 2 is an exploded view according to the preferred embodiment of the present invention.
Figure 3:
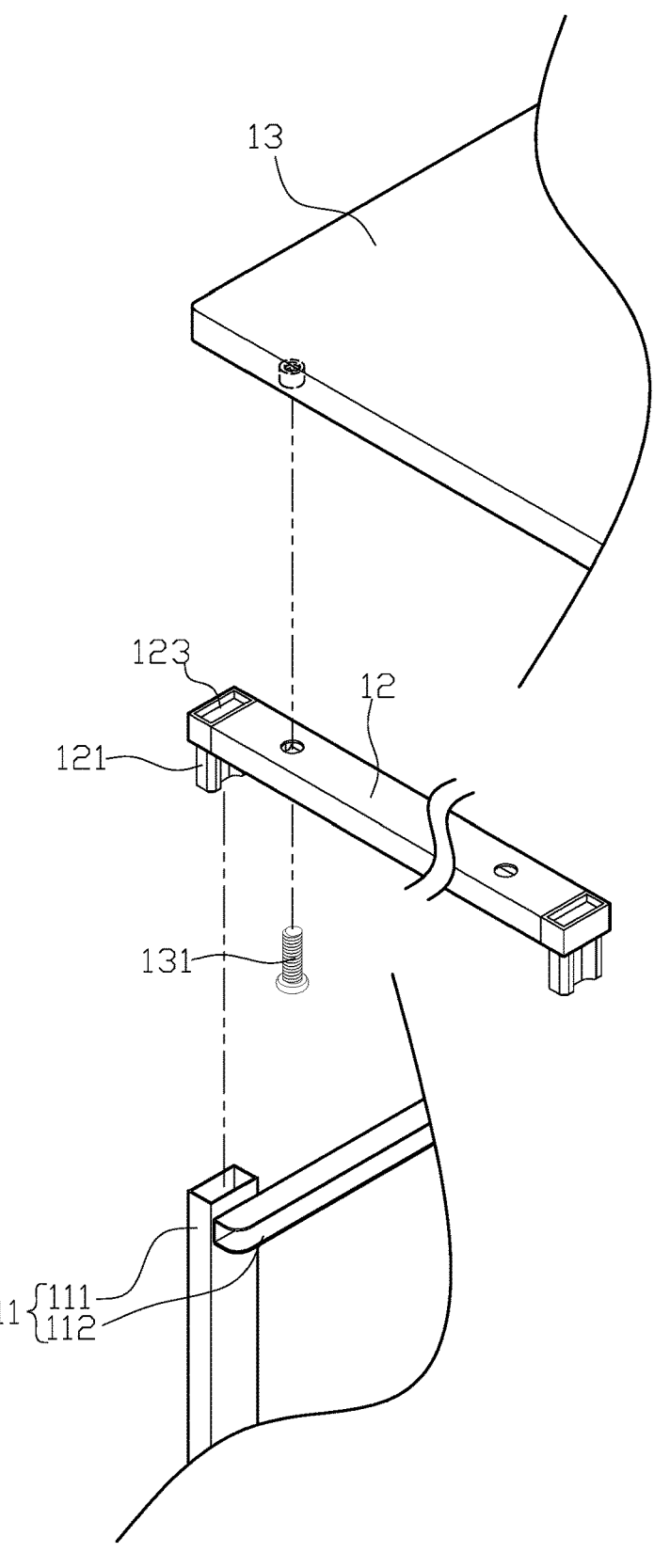
FIG. 3 is an exploded view of the top part according to the preferred embodiment of the present invention.
Figure 4:
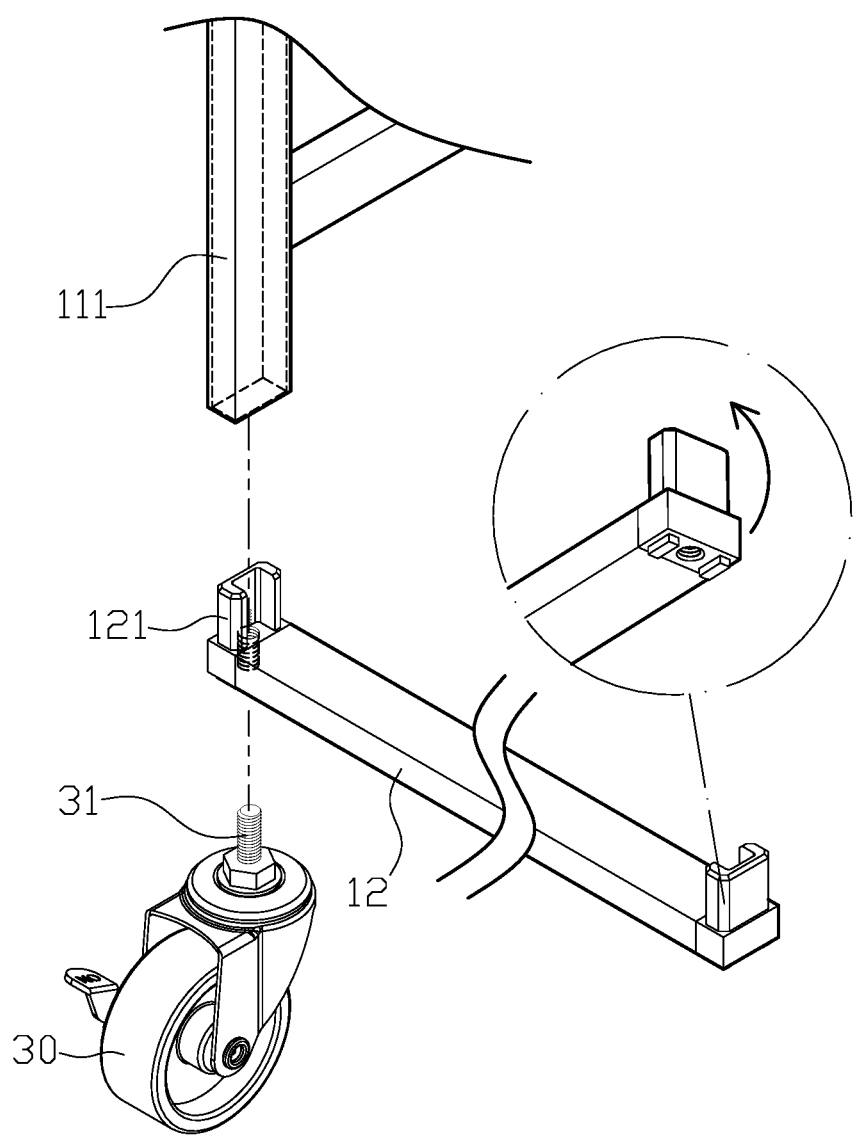
FIG. 4 is an exploded view of the bottom part of the preferred embodiment of the present invention.
Figure 5:
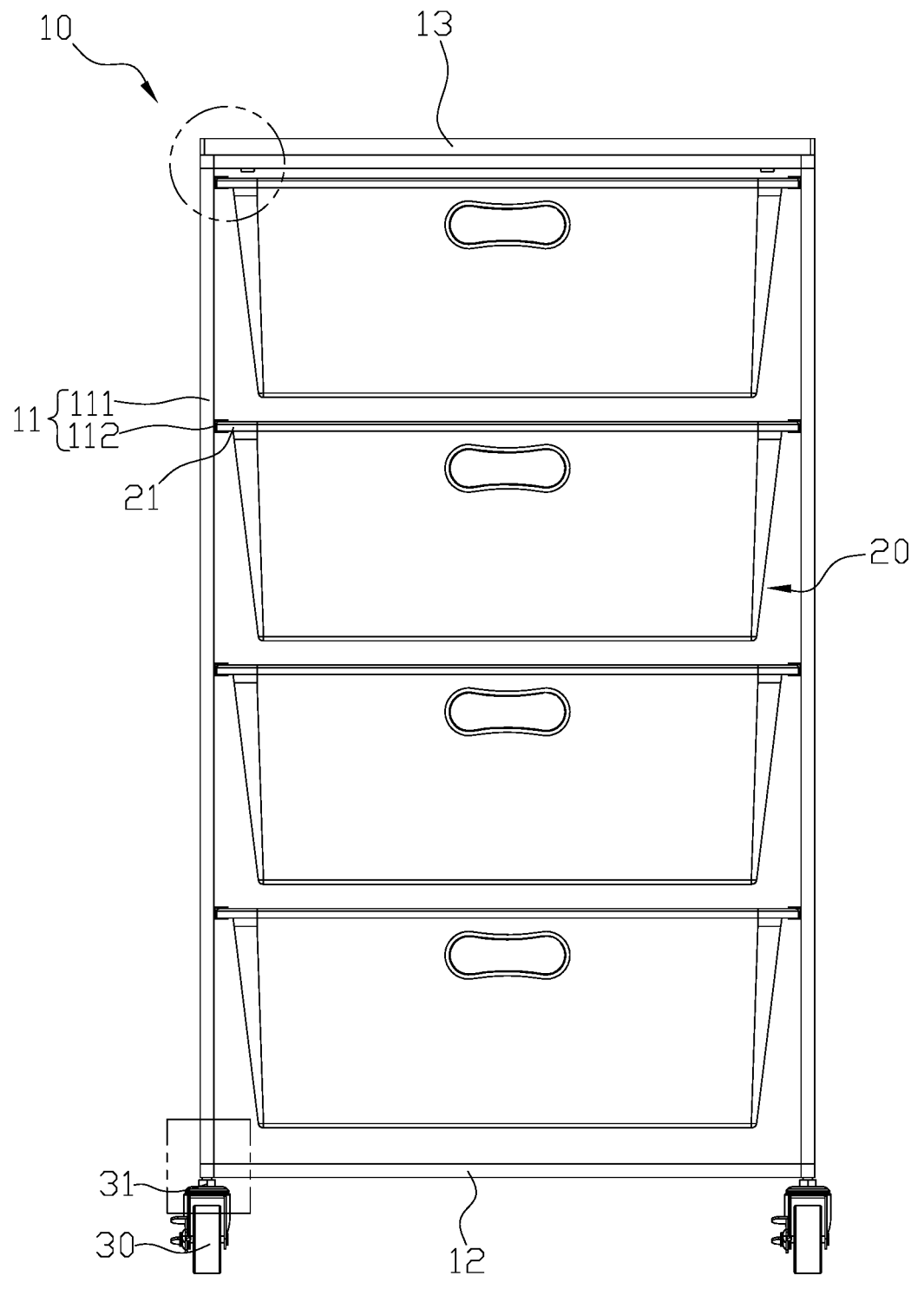
FIG. 5 is a front view of the preferred embodiment of the present invention.
Figure 6:
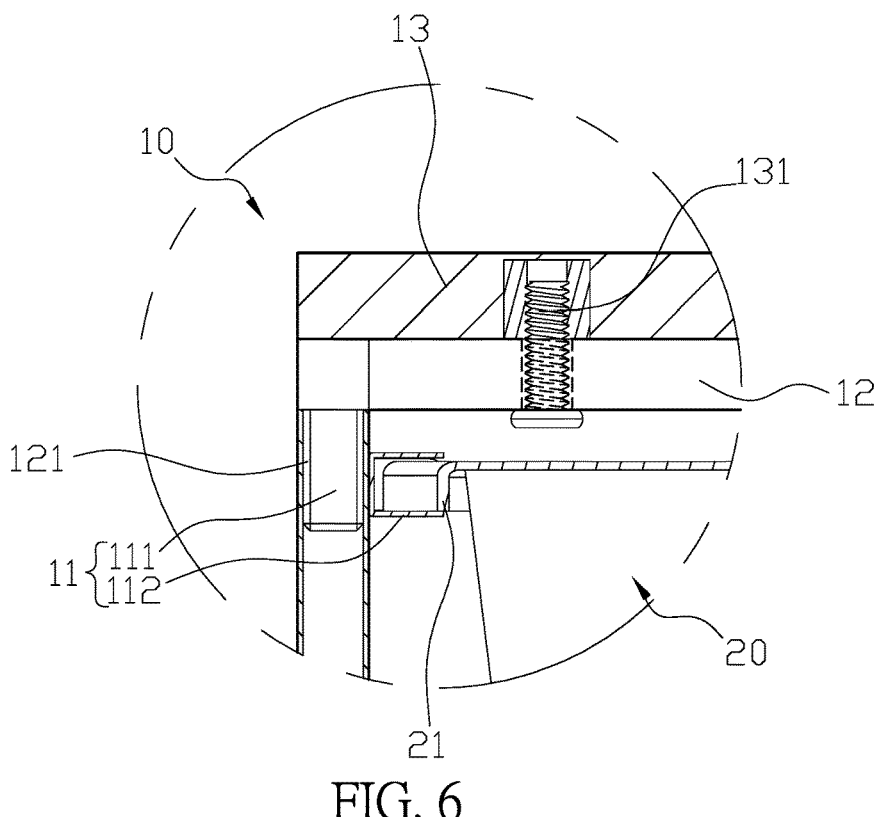
FIG. 6 is a local cross-sectional view of the top part of the preferred embodiment of the present invention.
Figure 9:
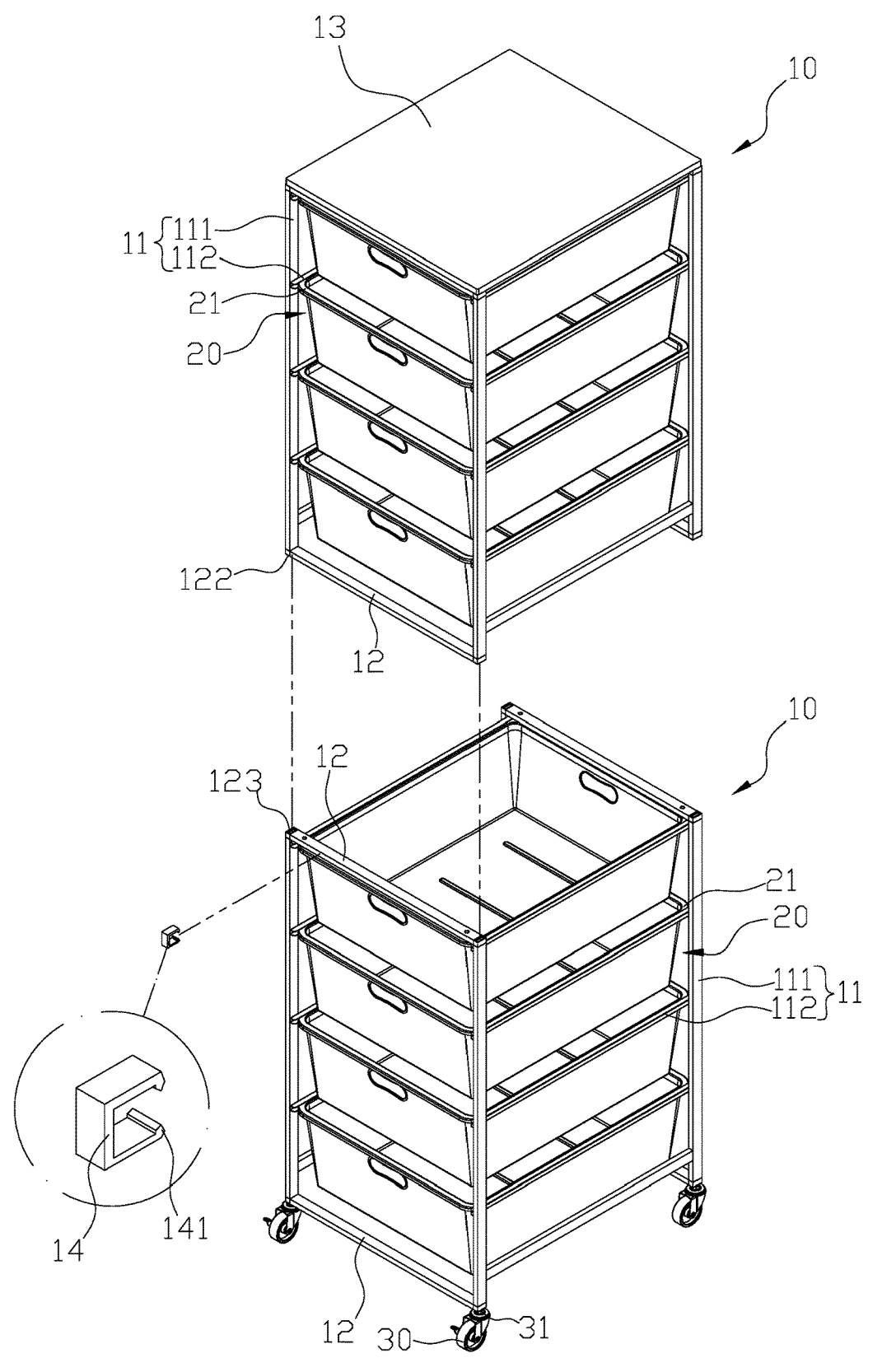
FIG. 9 is a schematic diagram showing stacked state of the preferred embodiment of the present invention.
Figure 11:
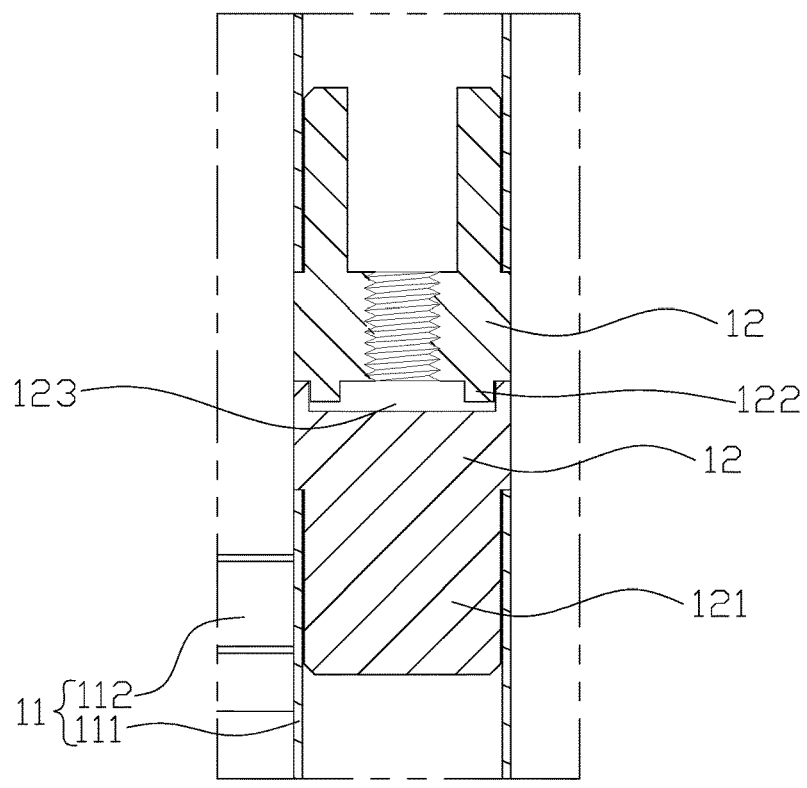
FIG. 11 is a schematic diagram of the engagement between the studs and the slots in the stacked state of the preferred embodiment of the present invention.

As shown in FIGS. 2, 9 and 11, each bottom edge bar 12 comprises a plurality of engaging studs 122 at a bottom side, and each top edge bar 12 comprises a plurality of corresponding engaging slots 123 for accepting the engaging studs 122 to stack another cart member 10.

Figure 10:
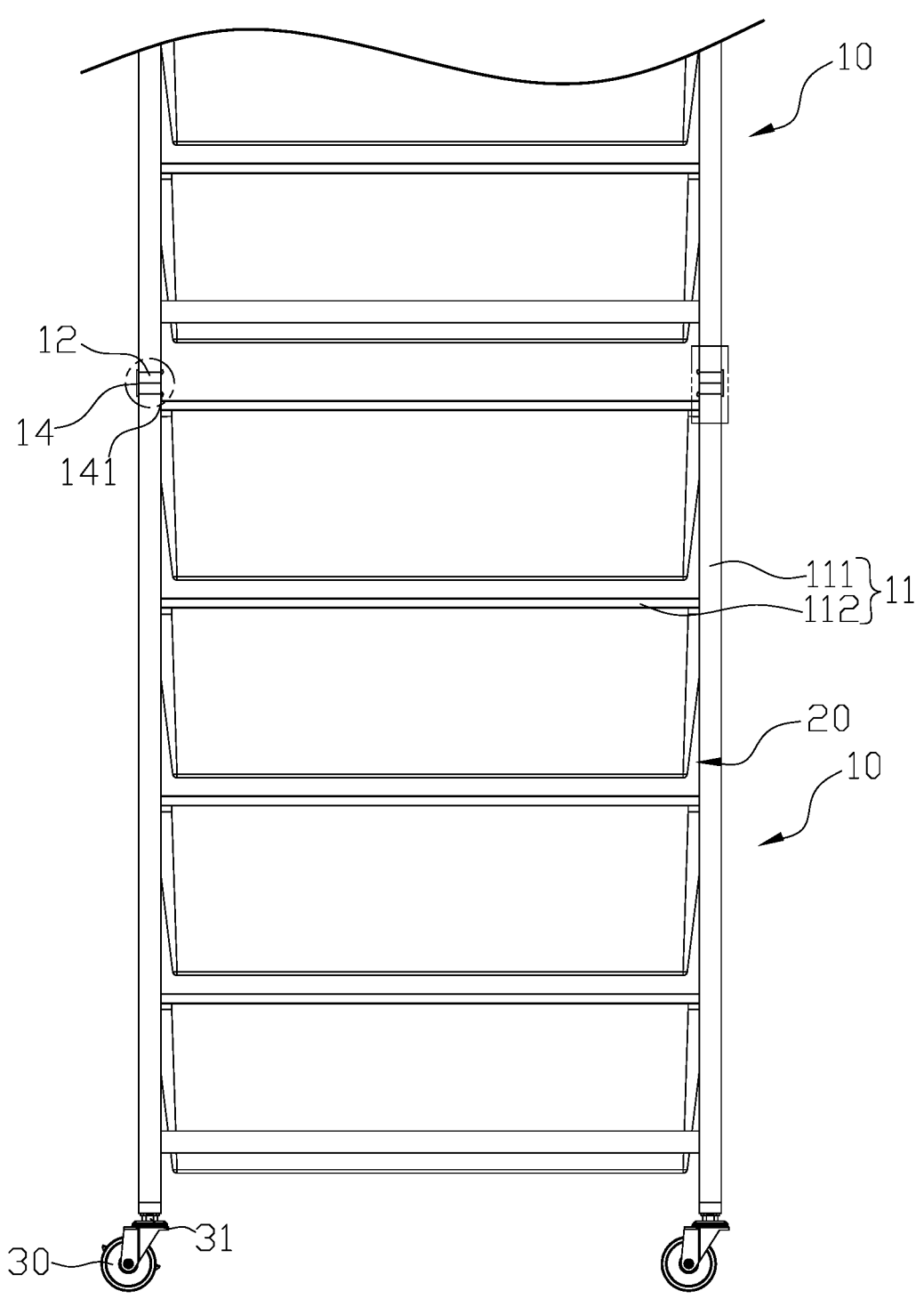
FIG. 10 is a side view of the stacked state of the preferred embodiment of the present invention.
Figure 12:
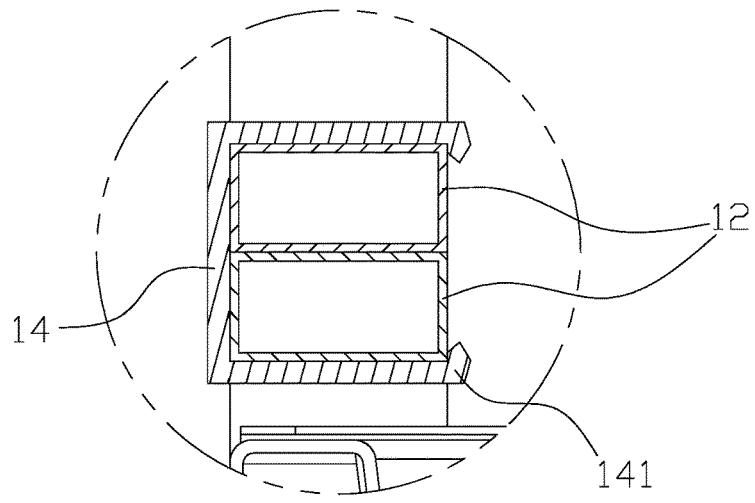
FIG. 12 is a schematic diagram of the use of the fasteners in the stacked state of the preferred embodiment of the present invention.

As shown in FIGS. 9, 10 and 12, when two cart members 10 are stacked together, each top edge bar 12 from the bottom cart member 10 and each bottom edge bar 12 from the top cart member 10 are combined by at least one C fastener 14, and the C fastener 14 respectively has a lip 141 to prevent each edge bar 12 from escaping.

Moreover, each drawer 20 further comprises a protruding edge 21 all around to engage with the grooves of the drawer track 112.

In addition, each drawer track 112 is welded onto the main frame 111.

Although the present invention has been explained in relation to its preferred embodiment, it is to be understood that many other possible modifications and variations can be made without departing from the spirit and scope of invention as hereinafter claimed.

What is claimed is:

1. A rolling storage cart with drawers comprising at least one cart member and a plurality of drawers; wherein:

the cart member has two side frames, two top edge bars, two bottom edge bars, and a plurality of wheels; each side frame comprises a main frame with a plurality of drawer tracks; two ends of each edge bar respectively comprises an engaging column, and a top end and bottom end of each main frame respectively jackets onto one of the engaging columns of each edge bar; each wheel has a screw lock for securing onto one of the bottom edge bars; and each drawer is configured to slidably engage two grooves of two opposite drawer tracks.

2. The rolling storage cart with drawers as claimed in claim 1, wherein the cart member further comprises a top board configured to be secured onto the top edge bars by a locking member.

3. The rolling storage cart with drawers as claimed in claim 2, wherein the locking member is configured to be hand operable.

4. The rolling storage cart with drawers as claimed in claim 1, wherein each screw lock is located at the engaging column of the bottom edge bar.

5. The rolling storage cart with drawers as claimed in claim 1, wherein each bottom edge bar comprises a plurality of engaging studs at a bottom side, and each top edge bar comprises a plurality of corresponding engaging slots for accepting the engaging studs to stack another cart member.

6. The rolling storage cart with drawers as claimed in claim 5, wherein when two cart members are stacked together, each top edge bar from the bottom cart member and each bottom edge bar from the top cart member are combined by at least one C fastener, and the C fastener respectively has a lip to prevent each edge bar from escaping.

7. The rolling storage cart with drawers as claimed in claim 1, wherein each drawer further comprises a protruding edge all around to engage with the grooves of the drawer track.

8. The rolling storage cart with drawers as claimed in claim 1, wherein each drawer track is welded onto the main frame.

* * * * *